United States Patent
Bracken et al.

(10) Patent No.: US 6,767,489 B2
(45) Date of Patent: Jul. 27, 2004

(54) METHOD TO MOLD ROUND POLYURETHANE ROLLERS FREE OF INJECTION GATES, PARTING LINES AND BUBBLES

(75) Inventors: Peter Wallace Bracken, Lexington, KY (US); Terry Cutshall, Lexington, KY (US); Wojciech Starski, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 121 days.

(21) Appl. No.: 10/207,349

(22) Filed: Jul. 29, 2002

(65) Prior Publication Data

US 2004/0016864 A1 Jan. 29, 2004

(51) Int. Cl.[7] .......................... B29C 45/14; B29C 70/72
(52) U.S. Cl. ...................... 264/83; 264/162; 264/271.1; 264/275; 264/279; 264/328.2; 264/328.9; 264/328.11; 425/117; 425/129.1; 425/215; 425/543; 425/546; 425/555; 425/562
(58) Field of Search .............................. 425/117, 129.1, 425/215, 546, 555, 562, 812, 543; 264/83, 328.9, 271.1, 85, 275, 279, 328.11, 162, 328.1

(56) References Cited

U.S. PATENT DOCUMENTS

| | | | |
|---|---|---|---|
| 2,085,959 A | * 7/1937 | Donegan | 264/279 |
| 2,367,235 A | 1/1945 | Morin | 264/161 |
| 3,100,676 A | * 8/1963 | Christie | 264/275 |
| 3,184,828 A | 5/1965 | Dames, Jr. | 425/500 |
| 3,443,001 A | 5/1969 | Adair et al. | 264/161 |
| 3,724,983 A | * 4/1973 | Nelson | 425/129.1 |
| 3,737,502 A | 6/1973 | Rees | 264/161 |
| 4,404,160 A | * 9/1983 | Bonissone et al. | 264/328.9 |
| 4,650,626 A | 3/1987 | Kurokawa | 264/278 |
| 4,729,862 A | 3/1988 | Salatiello et al. | 264/310 |
| 4,839,110 A | 6/1989 | Kingsbury | 264/2.2 |
| 4,892,696 A | 1/1990 | Murakami et al. | 264/219 |
| 5,011,646 A | 4/1991 | Bertschi | 264/297.2 |
| 5,089,201 A | 2/1992 | Takahashi | 264/135 |
| 5,538,677 A | * 7/1996 | Takahashi | 264/221 |
| 5,711,072 A | * 1/1998 | Nakamura | 29/895.32 |
| 5,753,165 A | 5/1998 | Watanabe et al. | 264/138 |
| 5,804,114 A | 9/1998 | Janes et al. | 264/82 |
| 5,874,172 A | 2/1999 | Beach et al. | 428/423.1 |
| 6,027,328 A | 2/2000 | Herbst | 425/553 |
| 6,228,303 B1 | 5/2001 | Voelkel | 264/161 |
| 6,432,031 B1 | * 8/2002 | Paasonen et al. | 492/56 |
| 6,468,460 B2 | * 10/2002 | Kinpara et al. | 264/271.1 |

* cited by examiner

*Primary Examiner*—Robert B. Davis
(74) *Attorney, Agent, or Firm*—John A. Brady (57) ABSTRACT

Solid rollers of a urethane material are formed in closed mold formed by a tube and two end plugs spaced by a shaft, the latter becoming the shaft for the roller. The closed mold avoids rough grinding to a cylindrical shape, as well as avoiding the resulting waste of material and introduction of defects that arise from rough grinding. The formation of bubbles during injection of the urethane material is avoided by filling the closed mold with carbon dioxide gas prior to injection. The formation of gate marks in the urethane material is avoided by repositioning the end caps after injection to separate the injection gate from the cylindrical cavity. The need to trim the ends of the roller is avoided by providing an annular cavity between the top end cap and the tube that receives excess urethane material to be drawn into the cylindrical cavity as the urethane shrinks during curing.

20 Claims, 6 Drawing Sheets

METHOD TO MOLD ROUND POLYURETHANE ROLLERS FREE OF INJECTION GATES, PARTING LINES AND BUBBLES

FIELD OF THE INVENTION

The present invention relates, in general, to developer rollers used in electrophotography, and more particularly, to a roller and its process of manufacture having a surface with uniform mechanical and electrical properties.

BACKGROUND OF THE INVENTION

In electrophotography (e.g., laser printers), the developer roller function is to develop a layer of toner on a photoconductor drum electrically discharged in an image pattern. A two layer, "coated" roller will develop a fixed quantity of toner per volt of development bias that is predetermined by the dielectric thicknesses of the photoconductor, the toner and the developer roller. This development characteristic is independent of process speed, within limits. In contrast, a solid roller of a single resistivity develops a quantity of toner based on the dielectric constants of the photoconductor and the toner, and the resistance of the roller in the photoconductor nip. This is dependent on the process speed. In addition, compared to a solid roller or a single resistivity, a two-layer roller has a longer time constant than a solid roll. A longer time constant material leaves a higher effective development surface potential on the developer roll at the entry to the photoconductor nip, thus improving the single pel dot print performance of the roller. Thus, two-layer rollers are thus generally preferred for electrophotographic developer rollers.

In U.S. Pat. No. 5,874,172, which is hereby incorporated by reference in its entirety, an economical and effective approach is disclosed of achieving a two-layer roller that is cast as a solid roller with the outer resistive layer achieved by oxidization. A cast urethane, electrically conductive rubber roller is produced with a surface layer of high electrical resistivity, mimicking the more difficult to produce coated rollers. The roller is composed of a polydiene, such as polyisoprene, and more specifically polybutadiene, either as a polyol or a urethane prepolymer, blended with a second polyurethane prepolymer and a conductive additive such as ferric chloride. The surface of the cured roller is oxidized by baking in air at a fairly high temperature (e.g., greater than 80 degrees C.) for several hours. The reaction of oxygen in the air with the polybutadiene, catalyzed by the ferric chloride, oxidizes the surface of the roller. In addition, an antioxidant material such as a hindered phenol is also added to the pre-cured urethane mixture to minimize further oxidization. Thereby, the service life of the roller is extended by at least a factor of ten.

Figure 1:
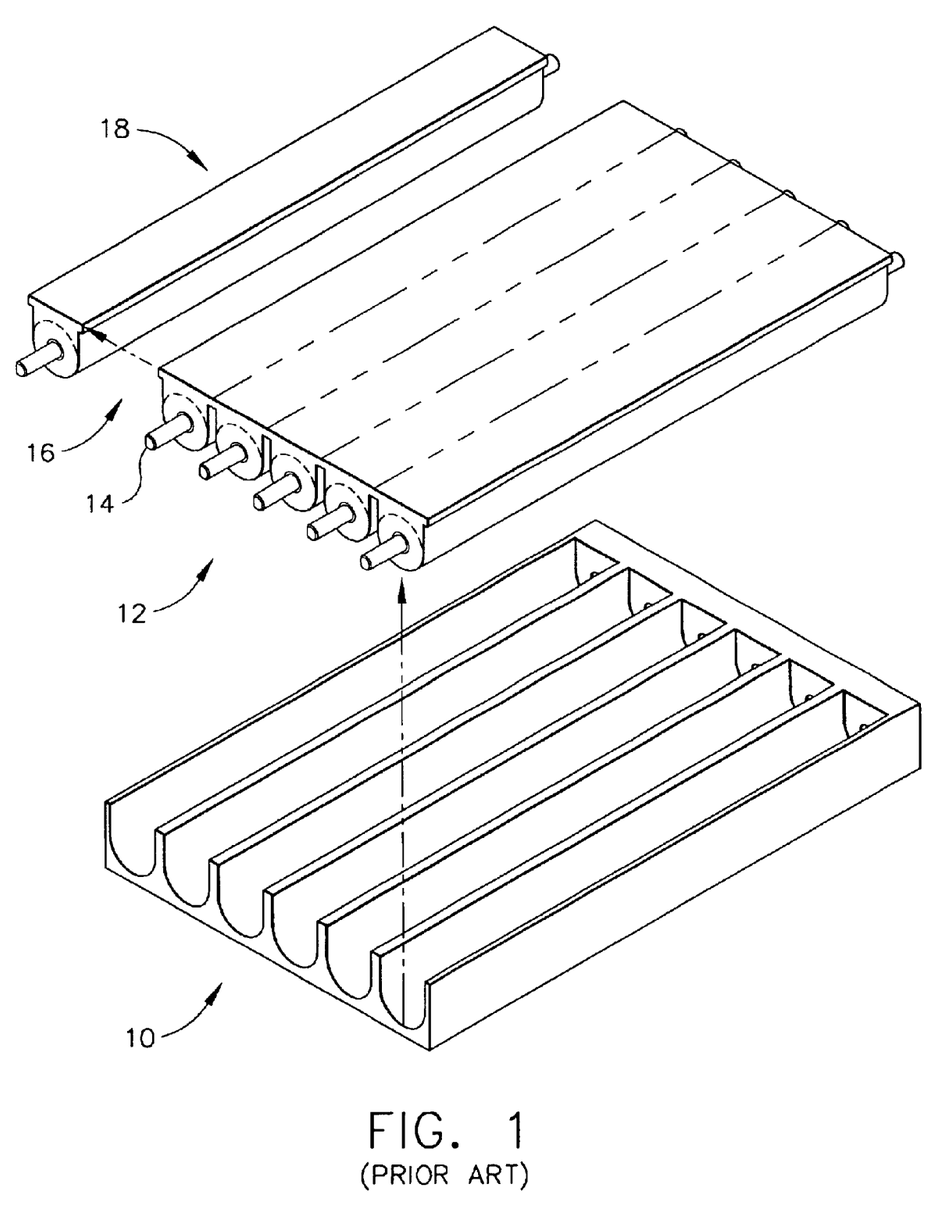
FIG. 1 is a perspective depiction of a generally known D-shaped, open mold with six newly molded, unfinished polyurethane rollers separated from the open mold.

For this and other urethane mixtures, the generally accepted approach to molding rollers is to use a horizontal, open six-cavity mold 10 such as depicted in FIG. 1. This orientation and being open along the length of the cavity provides air bubbles entrained into the pre-cured urethane mixture a relatively short vertical distance to travel. Ridding the roller of bubbles, even small ones, is necessary to achieve a uniform electrical characteristic for good printing performance. Bubbles at the surface create a particularly unacceptable defect, pitting the surface and causing toner to accumulate on the roller. The corresponding overdevelopment at this location creates a corresponding dot on each printed page. Having a short distance for the bubbles to travel is necessary because the urethane mixture is viscous and becomes more viscous as it begins to cure.

Using an open-cavity has disadvantages during the cure cycle. Heating the mold is used to enhance and accelerate the curing of the urethane mixture; however, the open mold causes a variation in temperature across the urethane mixture and a corresponding variation in the mechanical and electrical characteristics of the resulting cured urethane. This is especially true of the top-most portion of the material that is destined to be removed.

Figure 2:
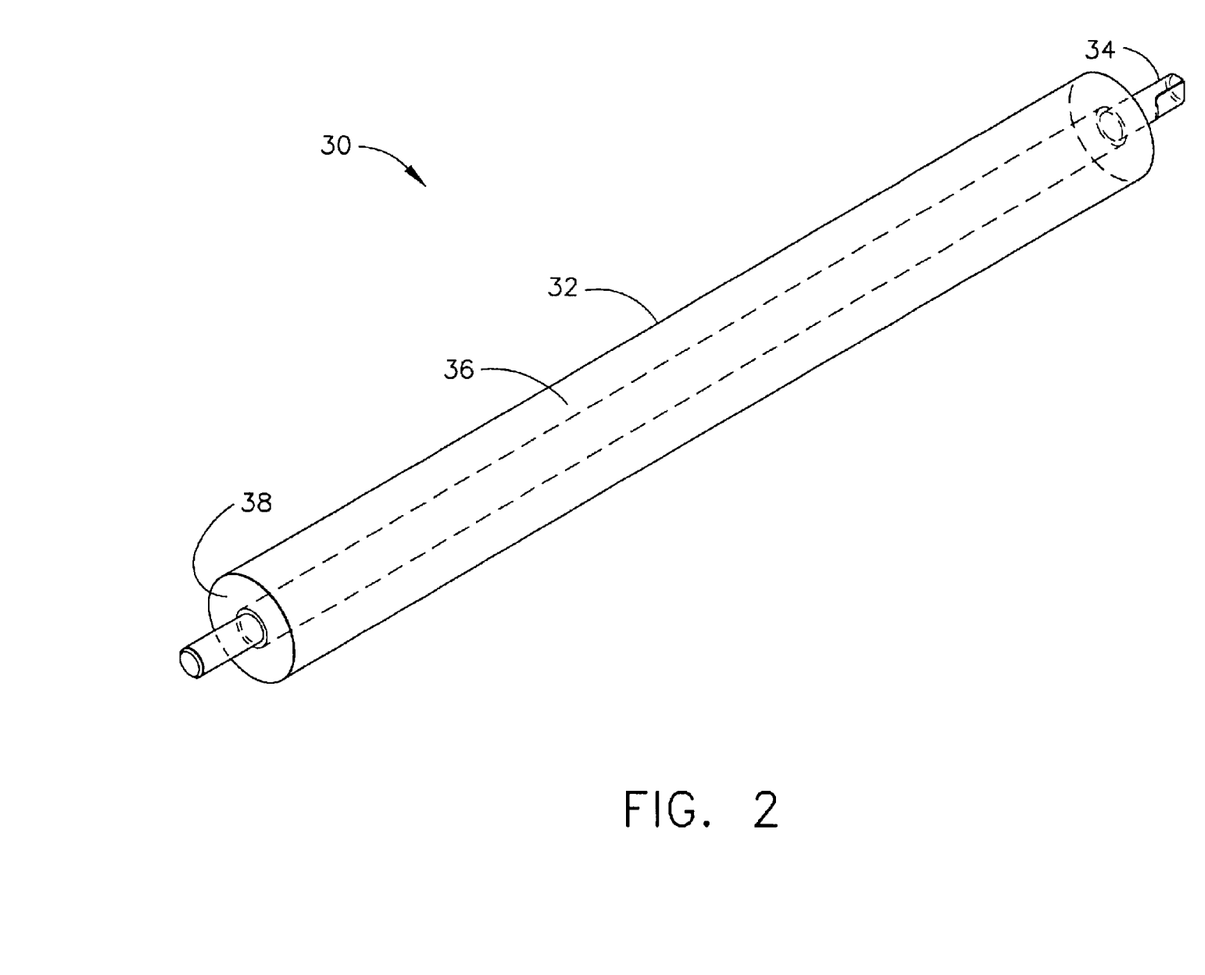
FIG. 2 is a perspective depiction of a finished polyurethane roller.

After the initial curing process is completed, an operator manually removes the one solid part 12 consisting of six identical, D-shaped rollers connected together, each having a steel shaft 14. Manual separation, such as at 16, is required. Then, each separated D-shaped roller 18 is rough ground ("G1"), where an excess portion 20 of approximately 30% of the urethane is removed and scrapped. A benefit of the rough grinding is that the excess portion 20 is more prone to having bubbles and having been improperly cured. However, this G1 grinding step rapidly transforms the D-shaped roller 18 from a D-shape to a round shaped roller 22, as depicted in FIG. 2. The rapid grinding generates a considerable amount of heat at the surface of the roller 22 and mechanical stress between the shaft 14 and the urethane cylinder 24, which may detrimentally affect the functional characteristics of the roller 22. The rough ground roller 22 is then placed in an oven for post curing to achieve the final physical properties of the urethane. In addition, precision grinding and finishing steps are performed to achieve the desired geometry and surface finish.

It has long been believed that molding rollers in a round cross-section configuration would offer significant manufacturing cost advantages by eliminating the "G1" grinding step, reducing the amount of waste material, and providing more uniform properties around the roller. However, problems with bubbles, gate marks (i.e., entry point for injecting urethane into the mold cavity), parting lines, and knit lines, all of which can create defects on the printed page, were difficult to overcome.

Furthermore, prior attempts at a closed mold encountered the difficulties of shrinkage of the urethane during curing. In an open mold, the longitudinal ends may be held fixed to the desired length, with required material drawn in from the excess portion 20 as the urethane material shrinks. However, with the cylindrical cross section of a closed mold, the excess for shrinkage had to be drawn from the longitudinal ends. Thus, a secondary operation to trim the ends of the urethane roller is required to achieve the proper length, thus offsetting some manufacturing efficiency over the open mold.

Consequently, a significant need exists for an approach for molding urethane rollers suitable as electrophotographic developer rollers that have fewer material defects and simplified shaping and finishing steps.

BRIEF SUMMARY OF THE INVENTION

The invention overcomes the above-noted and other deficiencies of the prior art by providing a method of using a closed cylindrical mold to produce electrophotographic developer rollers of the desired diameter without rough grinding and the desired length without trimming. A tube has a portion that is cylindrically shaped for the desired diameter and has sufficient length for the desired height of the roller. A shaft that will become part of the roller spaces a top end cap and a bottom end cap within the tube, each cap defining one end surface of the resulting roller. An injection gate through the tube into the cylindrical cavity is used to inject a urethane mixture that cures (hardens) to become roller, which is then precision ground, given finishing treatments, and oxidized in an oven. Thereby, the advantages of a solid roller are achieved without having to rough grind a non-cylindrically shaped roller.

In one aspect of the invention, prior to filling the cylindrical cavity of the tube with urethane mixture, the cylindrical cavity is filled with carbon dioxide, displacing the air. Then, when filling the cylindrical cavity with mixture, any bubble formed by the mixing of the carbon dioxide with the urethane mixture will rapidly be dissolved into the urethane mixture. Thereby, rollers are produced without the defect of bubbles that would degrade or preclude their use as electrophotographic developer rollers.

In another aspect of the invention, after filling the cylindrical cavity with the urethane mixture, the assembly of the top end cap, shaft, and bottom end cap, as well as the urethane mixture captured therein, is repositioned within the tube such that the injection gate is separated from the urethane mixture in the cylindrical cavity. Thus, no gate mark is formed in the urethane mixture as it cures, avoiding another defect that would degrade or preclude the use of the roller. Moreover, a secondary process is avoided of removing cured material in an injection gate prior to being able to demold the roller from the mold.

In yet another aspect of the invention, one of the end caps and the tube define a cavity into which excess urethane mixture flows through a small gap during injection of the urethane mixture into the cylindrical cavity. During curing, the urethane mixture contracts, drawing in some or all of the excess urethane mixture. Thereby, the desired length and contour of the ends of the roller are provided without trimming. In some applications, the gap is annular and at a diameter from the shaft greater than the final diameter after precision grinding, and is thus removed during this step without trimming of the ends.

These and other objects and advantages of the present invention shall be made apparent from the accompanying drawings and the description thereof.

DETAILED DESCRIPTION OF THE INVENTION

Turning to the Drawings, wherein like numbers denote like components throughout the several views, FIG. 2 depicts a roller 30 consistent with aspects of the invention that is closed molded to the desired cross section and length without rough grinding ("G1") or end trimming. Moreover, an outer surface 32 of the roller 30 is inherently uniform in mechanical and electrical properties, and thereby suitable for high quality electrophotographic developer functions. The components of the roller 30 are a steel shaft 34 coated with an adherence material 36 that enhances the attachment of a urethane cylinder 38 to the shaft 34 and promotes electrical continuity between the urethane cylinder 38 and the shaft 34. Composition of the urethane cylinder 38 may be as described in the previously incorporated U.S. Pat. No. 5,874,172, although it will be appreciated that aspects of the present invention have application to other compositions.

Figure 3:
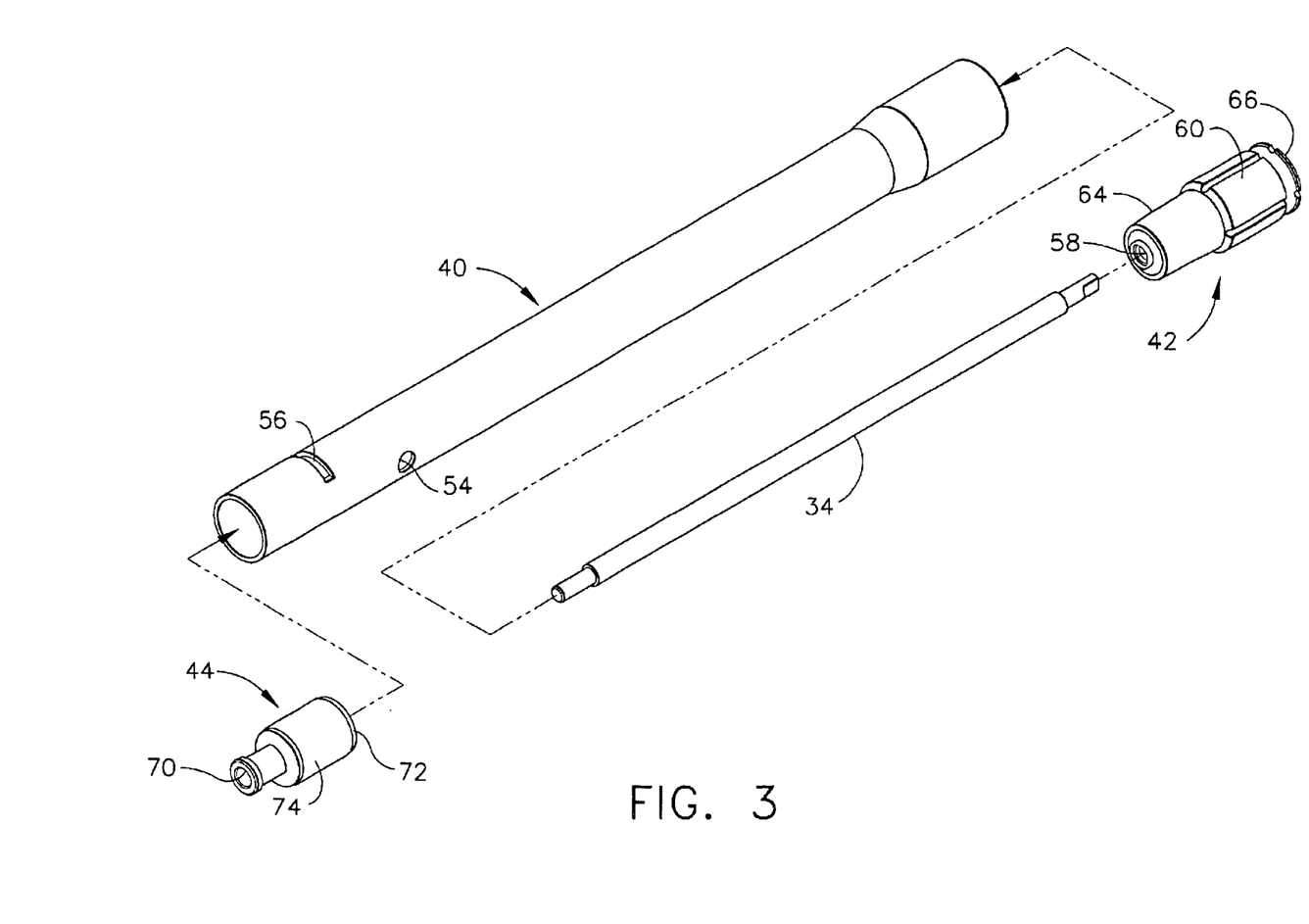
FIG. 3 is a disassembled mold consistent with the present invention for producing the polyurethane roller of FIG. 2.
Figure 4:
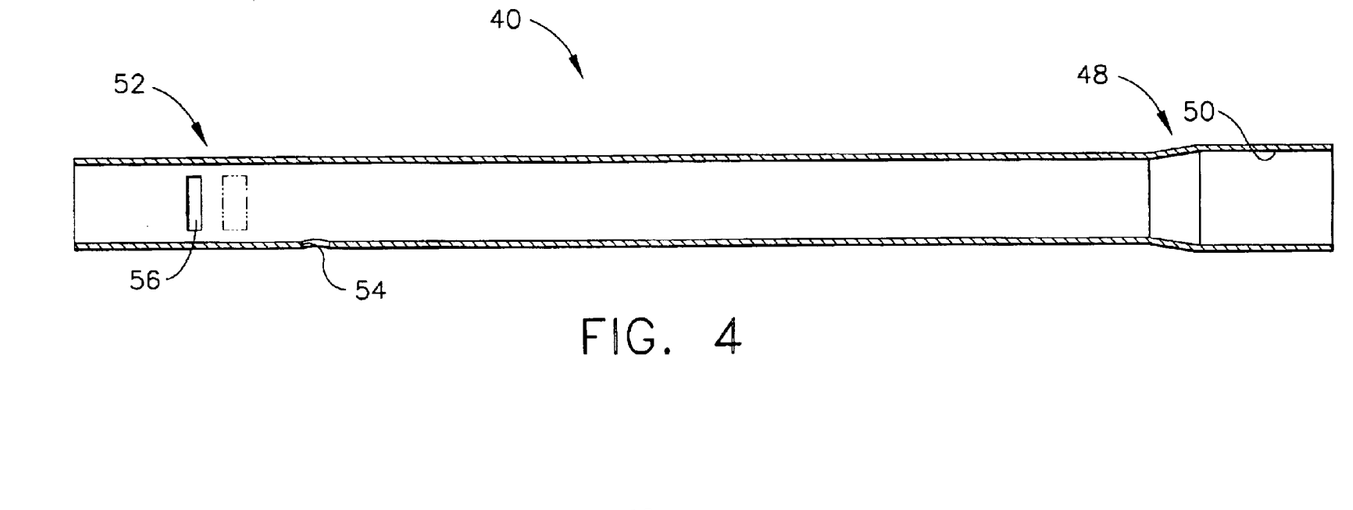
FIG. 4 is a longitudinal cross section view of a mold tube of the mold of FIG. 3.
Figure 5:
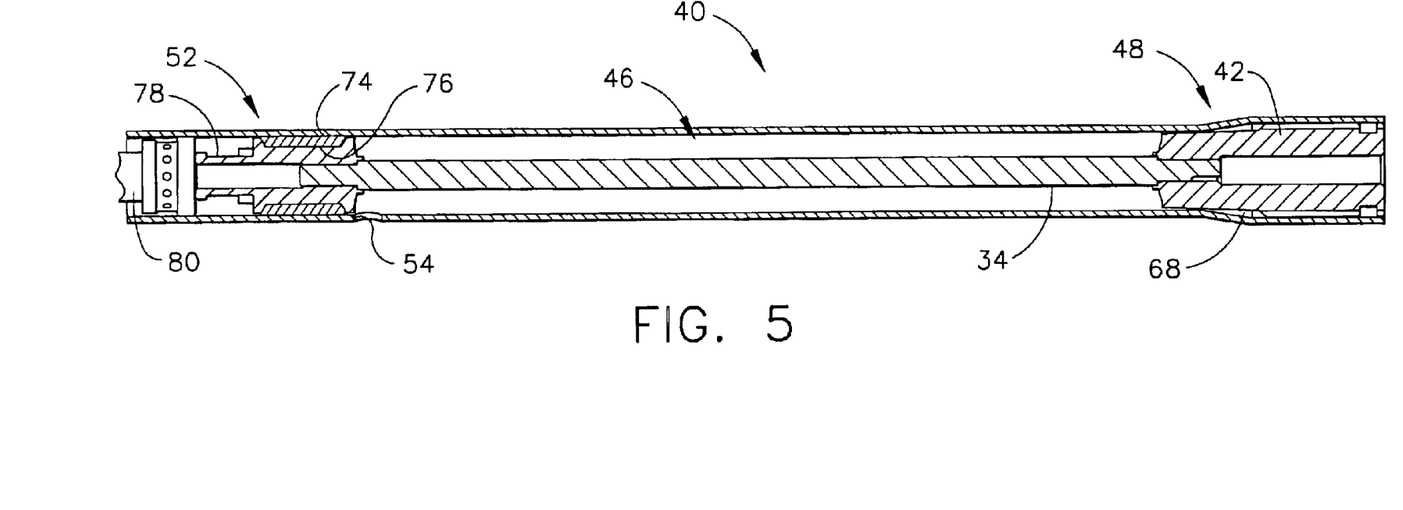
FIG. 5 is a longitudinal cross section view of the mold of FIG. 3 assembled in preparation for the molding process.

FIGS. 3–5 depicts a round, open ended tube 40 that is used in conjunction with a top end plug 42 and a bottom end plug 44 to form a mold with a cavity 46 defined therein (FIG. 5) to mold the roller 30. The steel shaft 34 spaces the top and bottom end plugs 42, 44 during molding and thereafter is part of the roller 30. These components lend themselves to automated production of rollers 30 with a low incidence of defects. The tube 40 is formed from seamless D.O.M. (Drawn Over Mandrel) steel tubing to achieve an upper portion 48 of increased inner diameter. An inner surface 50 of the tube 40 is selected to have the desired diameter and is anodized to form a hard, porous surface and then coated with TEFLON tetrafluoroethylene polymer to create a durable surface that does not bond to urethane material. A bottom portion 52 of the tube 40 has an injection gate hole 54 that receives a fitting, below which is a locking slot 56 that receives a locking member (not shown).

With particular reference to FIGS. 3 and 5, the top end plug 42, which is made of SST 303 stainless steel, has a through hole 58 centered on its longitudinal axis to receive one end of the shaft 34. The top end plug has an upper section 60 with a diameter selected to center the shaft 34 and to slide within the upper portion 48 of the tube 40. The upper section 58 has a plurality of longitudinally aligned vent slots 62 that communicate between a lower section 64 and a top surface 66 of the top end plug 42.

With particular reference to FIG. 3 and FIG. 5, the lower section 64 has a reduced diameter that is approximately 0.1 mm smaller than the corresponding diameter of the tube 40. This forms an annular gap between the upper portion 48 of the tube 40 and the lower section 64 of the top end plug 42. Through this annular gap flows excess uncured urethane material into annular cavity 68 during molding that is drawn back into the cavity 46 as the urethane material shrinks during curing. Thus, any excess remaining in the annular gap 68 is readily removed during finish grinding ("G2") wherein about 0.1 mm is removed.

With reference to FIGS. 3 and 5, the bottom end plug 44, which is also made of SST 303 stainless steel, includes a longitudinally aligned and centered through hole 70 for receiving the other end of the shaft 34. The bottom end plug 44 includes an upper sealing section 72 having a diameter for a close, sliding relation with the bottom portion 52 of the tube 40. An annular band 74 of DELRIN acetal within an annular recess 76 of the upper sealing section 72 advantageously swells when heated during molding to increase the sealing to the tube 40 until the urethane materials cures. The bottom end plug 44 has a bottom locking section 78 of a reduced diameter so that the locking member may be inserted through the locking slot 56 to keep the plugs 42, 44 in position in later stations along a manufacturing line when a pusher rod 80 is no longer supporting the plugs 42, 44, as shown in FIG. 5.

FIGS. 4–10 depict the process of molding rollers 30 that do not require rough grinding ("G1") and that have reduced defects that arise from an open mold and from rough grinding. In FIG. 4, the tube 40 is empty and awaiting use at station A. In FIG. 5, the top end plug 42, bottom end plug 44, and shaft 34 are assembled and lowered into the top opening of the tube 40, coming to rest upon the pusher rod 80. The pusher rod 80 allows the assembly to reside a fill position, wherein the entire bottom end plug 44 is below the injection gate hole 54.

Figure 6:
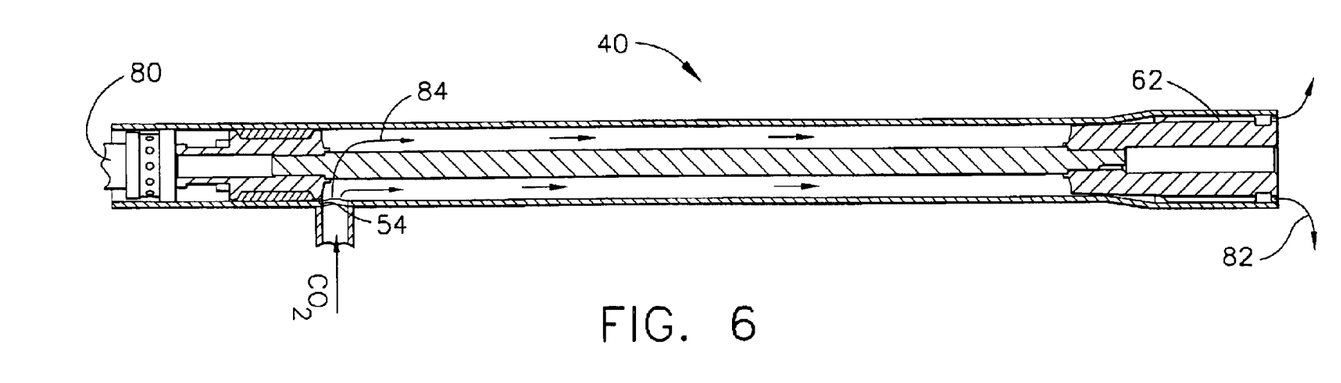
FIG. 6 is a longitudinal cross section view of the mold of FIG. 5 having an interior cavity filled with carbon dioxide gas, displacing air from the mold.

In FIG. 6, the tube 40 is moved to station B, wherein the air within the cavity 46 inside the tube 40 is expelled through the vents, such as depicted by arrows 82, by injecting carbon dioxide gas into the injection gate hole 54, such as depicted by arrows 84.

Figure 7:
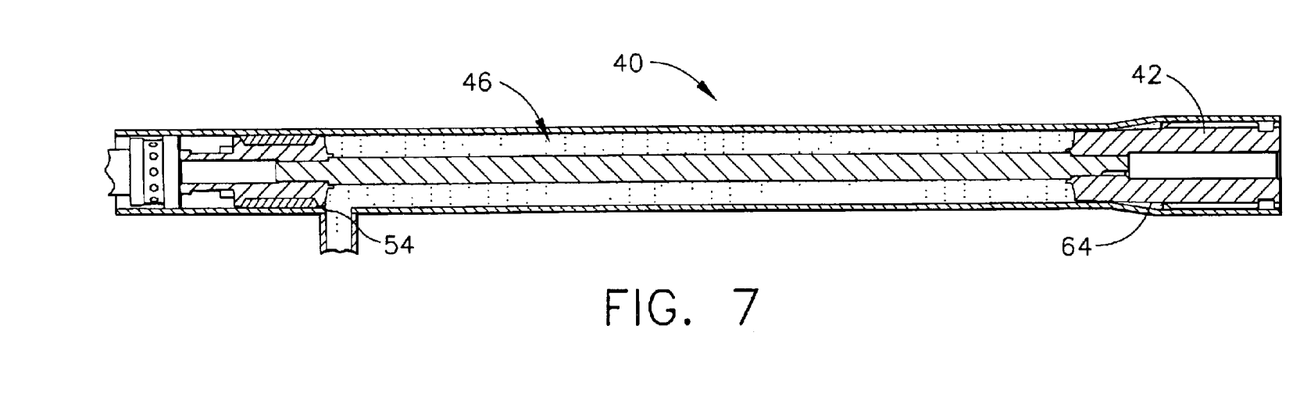
FIG. 7 is a longitudinal cross section view of the mold of FIG. 6 after having been filled with a pre-cured urethane mixture.

In FIG. 7, the tube 40 is positioned at station C for filling. The tube 40 is vertically positioned with the hole 54 at the lowest point to facilitate uniform and laminar flow of the urethane into the cavity 46. The urethane mixture has been preheated to 73 degrees C., and the formulation of prepolymer, curatives and other additives thoroughly mixed in a manner to not introduce bubbles and moisture. Then urethane mixture is injected into the cavity 46 at 800–1200 grams per minute at a pressure of 30–60 pounds per square inch, forcing the carbon dioxide gas out of the vents 62. The use of carbon dioxide prevents the formation of bubbles as the urethane mixture fills the cavity 46 since any carbon dioxide bubbles formed are rapidly absorbed into the urethane. The amount of urethane mixture injected is calculated or sensed so that the proper amount of excess material surrounds the lower section 64 of the top end plug 42.

Figure 8:
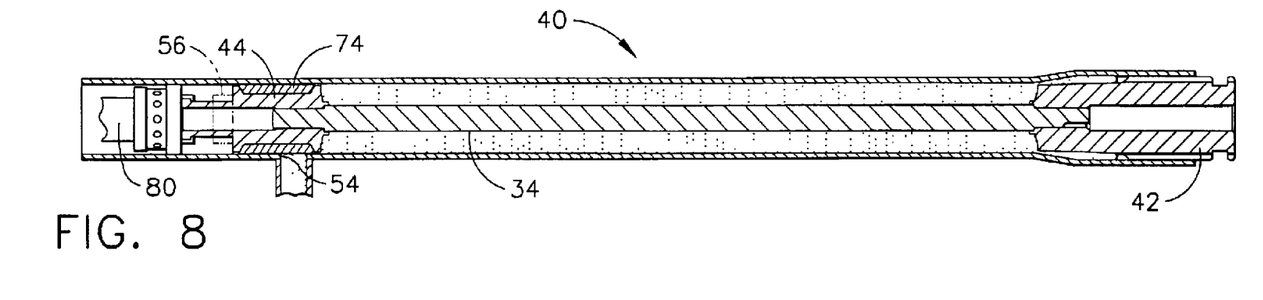
FIG. 8 is a longitudinal cross section view of the mold of FIG. 7 with the plug-shaft assembly raised to separate the mold cavity from the mold gate.

In FIG. 8, the pusher rod 80 has raised the top end plug 42, bottom end plug 44, shaft 34, and urethane material to a closed position wherein the bottom end plug 44 completely blocks the injection gate hole 54. Thus, the urethane has no opportunity to create a gate mark from the hole 54 that would impair later use. Also, the locking member has been inserted into the locking slot 56 to prevent the bottom end plug 44 from lowering. The annular band 74 soon warms from the heated urethane mixture and seals against the tube 40.

Figure 9:
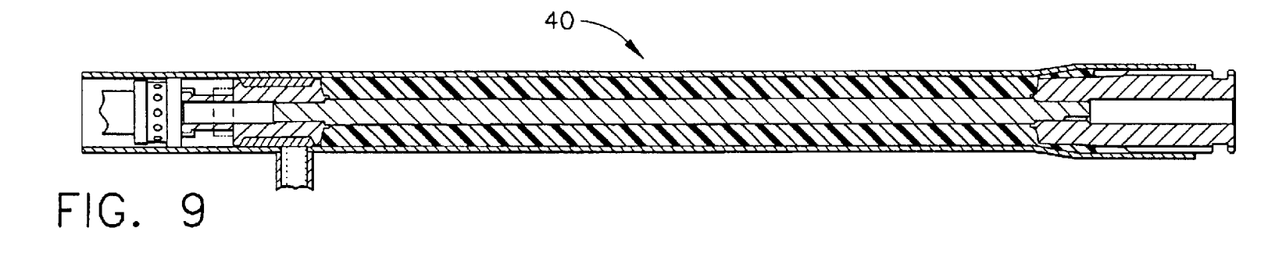
FIG. 9 is a longitudinal cross section view of the mold of FIG. 8 after heat curing the urethane mixture.
Figure 10:
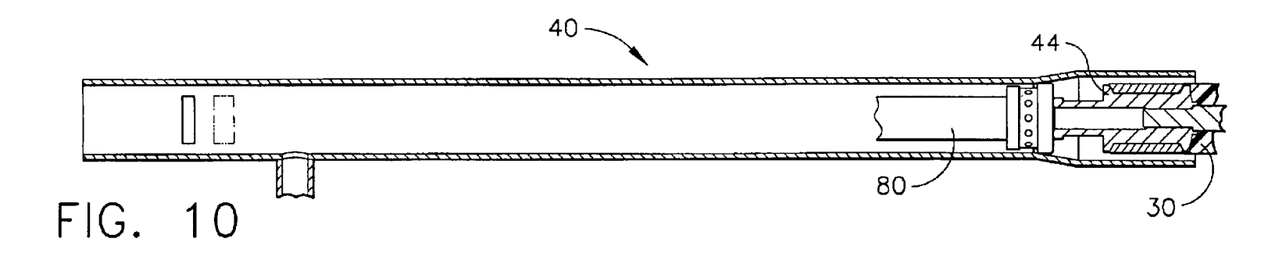
FIG. 10 is a longitudinal cross section view of the roller and plug being pushed out of the mold tube.

In FIG. 9, the tube 40 is transferred through an oven at 93 degrees C. for at least twelve minutes to cure (harden) the urethane. Then the tube 40 is cooled. In FIG. 10, the tube 40 is positioned over a pusher rod 80 that pushes the formed roller 30 along with the top and bottom end plugs 42, 44. As the pusher rod 80 is lowered, pressurized air is forced through annularly spaced openings near the head of the pusher rod, aiding in the removal of any urethane residue left on the inner surface of the tube 40. Thereafter, the end plugs 42, 44 are removed from the roller 30 for reuse. The roller 40 receives precision grinding and finishing steps, then roller 30 undergoes heating in the presence of oxygen to form a resistive oxidized outer coating.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. For example, although a flared tube 40 is depicted, it will be appreciated that a cylindrical tube may be used with the lower section of the top end plug sized as appropriate for the appropriate amount of excess material for later shrinkage. However, this approach may require additional grinding or end trimming.

As an additional example, although vertical orientation of the tube 40 during molding is depicted, it will be appreciated that other orientations may be used.

As a further example, although an annular recess 76 is advantageously described that simplifies removal, it will be appreciated that a recess consistent with aspects of the invention may be discontinuous about the circumference of one or both plugs 42, 44.

What is claimed is:

1. A method of manufacturing a electrophotographic developer roller in a cylindrical portion of a tube, comprising:

defining a cylindrical cavity in the tube with a top end plug and a bottom end plug spaced by a shaft;

filling the cylindrical cavity with carbon dioxide;

injecting a pre-cured urethane mixture into the cylindrical cavity;

allowing the urethane mixture to cure; and removing the top and bottom end plugs and the roller comprised of the cured urethane mixture and shaft.

2. The method of claim 1, further comprising:

defining vent passages longitudinally in the top end plug for venting gas from the cylindrical cavity.

3. The method of claim 2, further comprising:

repositioning top and bottom end plugs to separate the cylindrical cavity from the injection gate after injecting the pre-cured urethane mixture into the cylindrical cavity.

4. The method of claim 2, further comprising:

vertically positioning the tube;

providing an annular cavity between the top end plug and the tube;

injecting the pre-cured urethane mixture into the cylindrical cavity of a predetermined amount to fill the cylindrical cavity and a portion of the annular cavity;

allowing the urethane mixture to cure and to draw in urethane mixture from the annular cavity to compensate for shrinkage.

5. The method of claim 4, further comprising:

repositioning top and bottom end plugs to separate the cylindrical cavity from the injection gate after injecting the pre-cured urethane mixture into the cylindrical cavity.

6. The method of claim 1, wherein removing the top and bottom end plugs and the roller comprised of the cured urethane mixture and shaft further comprises:

cooling the tube;

pushing against a selected one of the top and bottom end plugs with a pusher rod; and blowing compressed air through the pusher rod to an inner surface of the tube when retracting the pusher rod.

7. A method of manufacturing a electrophotographic developer roller in a cylindrical portion of a tube, comprising:

defining a cylindrical cavity in the tube with a top end plug and a bottom end plug spaced by a shaft;

injecting a pre-cured urethane mixture into the cylindrical cavity through an injection gate;

before said urethane mixture is cured repositioning top and bottom end plugs to separate the cylindrical cavity from the injection gate;

allowing the urethane mixture to cure; and removing the top and bottom end plugs and the roller comprised of the cured urethane mixture and shaft.

8. The method of claim 7, wherein repositioning the top and bottom end plug further comprises:

defining an injection gate in a lower portion of the cylindrical cavity;

positioning the lower end plug in the tube below the injection gate;

after injection of the pre-cured mixture, pushing on a lower surface of the lower end plug to block the injection gate.

9. The method of claim 8, further comprising:

forming around the bottom end plug an annular band of a material that expands when heated.

10. The method of claim 8, further comprising:

locking the lower end plug into position after blocking the injection gate with the bottom end plug.

11. A method of manufacturing a electrophotographic developer roller in a cylindrical portion of a tube, comprising:

vertically positioning the tube;

defining a cylindrical cavity in the tube with a top end plug and a bottom end plug spaced by a shaft;

providing an annular cavity between the top end plug and the tube;

injecting a pre-cured urethane mixture into the cylindrical cavity of a predetermined amount to fill the cylindrical cavity and a portion of the annular cavity;

allowing the urethane mixture to cure and to draw in urethane mixture from the annular cavity to compensate for shrinkage; and removing the top and bottom end plugs and the roller comprised of the cured urethane mixture and shaft.

12. The method of claim 11, wherein the tube includes an upper portion of increased diameter, the top end plug including a lower section of reduced diameter, the annular cavity defined between the top end plug and the tube.

13. The method of claim 12, further comprising:

performing grinding of the cylindrical sides of the cured urethane mixture to a desired diameters sufficient to remove any material that cured within the annular cavity.

14. The method of claim 11, defining a vent between a top surface of the top end plug and the annular cavity.

15. A device for molding rollers, comprising:

a tube having a cylindrical portion;

a first end plug sized to slidingly seal a first section of the tube;

a second end plug sized to slidingly seal a second section of the tube;

an injection gate proximate the second end plug; and a roller shaft centered in the cylindrical portion and removably received on each end by the first and second end plugs;

wherein the assembled first end plug, second end plug, and shaft are slidable between a first position and second position with the tube to selectably couple the injection gate to the cylindrical portion of the tube.

16. The device of claim 15, wherein the first end plug includes a vent that communicates between the cylindrical portion of the tube and outside of the tube.

17. The device of claim 16, wherein the first end plug and an inner surface of the tube defines an annular cavity, the annular cavity communicating between the vent and the cylindrical portion for receiving excess material for compensating with shrinkage.

18. The device of claim 17, wherein a portion of the tube proximate to the first end plug has an increased diameter relative to the cylindrical portion.

19. The device of claim 18, further comprising:

a carbon dioxide source selectively coupled to the injection gate; and a urethane mixture source selectively coupled to the injection gate.

20. The device of claim 19, further comprising a means for positioning the assembled first end plug, second end plug, and shaft.

* * * * *